United States Patent
Morita et al.

(10) Patent No.: US 12,039,050 B2
(45) Date of Patent: Jul. 16, 2024

(54) INFORMATION PROCESSING DEVICE

(71) Applicant: HITACHI ASTEMO, LTD., Hitachinaka (JP)

(72) Inventors: Nobuyoshi Morita, Tokyo (JP); Hiroki Yamazaki, Hitachinaka (JP); Kota Ideguchi, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 206 days.

(21) Appl. No.: 17/414,824

(22) PCT Filed: Dec. 20, 2019

(86) PCT No.: PCT/JP2019/050023
§ 371 (c)(1),
(2) Date: Jun. 16, 2021

(87) PCT Pub. No.: WO2020/137852
PCT Pub. Date: Jul. 2, 2020

(65) Prior Publication Data
US 2022/0019669 A1 Jan. 20, 2022

(30) Foreign Application Priority Data
Dec. 28, 2018 (JP) ................. 2018-247787

(51) Int. Cl.
*G06F 21/57* (2013.01)
*G05D 1/00* (2024.01)
*G06F 8/656* (2018.01)

(52) U.S. Cl.
CPC ......... *G06F 21/572* (2013.01); *G05D 1/0214* (2013.01); *G06F 8/656* (2018.02)

(58) Field of Classification Search
CPC ... G05D 1/0214; G06F 21/554; G06F 21/572; G06F 21/56; G06F 21/55; G06F 21/86;
(Continued)

(56) References Cited

U.S. PATENT DOCUMENTS 7,010,624 B1 * 3/2006 Zhou ..................... G06F 9/4413
710/62
8,490,179 B2 * 7/2013 Proudler ................. G06F 21/57
726/21

(Continued)

FOREIGN PATENT DOCUMENTS

| CN | 1877526 A | 12/2006 |
|----|-----------|---------|
| JP | 2014-115973 A | 6/2014 |

(Continued)

OTHER PUBLICATIONS

Extended European Search Report issued in corresponding EP Application No. 19902616.2 dated Aug. 4, 2022 (9 pages).

(Continued)

*Primary Examiner* — Michael Simitoski
(74) *Attorney, Agent, or Firm* — Foley & Lardner LLP

(57) ABSTRACT

An information processing device that can update software includes: a storage unit that stores control information for controlling whether or not the software can be updated; a communication unit that receives a communication message transmitted from another information processing device connected thereto via a communication line; an update control unit that updates the control information on the basis of the communication message received by the communication unit; and an update propriety determination unit that determines whether or not the software can be updated, on the basis of the control information.

9 Claims, 11 Drawing Sheets

(58) Field of Classification Search
CPC ............ G06F 2221/2111; G06F 8/656; H04W 12/122; H04W 12/128; H04W 12/126; H04W 12/35; H04L 63/1416; H04L 63/1441; H04L 63/1466; H04L 63/145
See application file for complete search history.

(56) References Cited

U.S. PATENT DOCUMENTS

| | | | | |
|---|---|---|---|---|
| 9,847,970 | B1* | 12/2017 | Zipperer | H04L 63/1458 |
| 9,904,785 | B2* | 2/2018 | Chand | H04W 9/3236 |
| 10,678,529 | B1* | 6/2020 | Farhan | H04L 67/34 |
| 2002/0083175 | A1* | 6/2002 | Afek | H04L 63/1416 |
| | | | | 709/239 |
| 2005/0132179 | A1* | 6/2005 | Glaum | G06F 11/1433 |
| | | | | 713/1 |
| 2006/0069912 | A1* | 3/2006 | Zheng | H04L 63/0823 |
| | | | | 713/151 |
| 2006/0277279 | A1 | 12/2006 | Hase | |
| 2007/0157000 | A1* | 7/2007 | Qawami | G11C 16/22 |
| | | | | 711/170 |
| 2008/0005360 | A1* | 1/2008 | Belgaied | H04L 63/1408 |
| | | | | 709/251 |
| 2012/0072734 | A1* | 3/2012 | Wishman | G06F 21/64 |
| | | | | 713/189 |
| 2013/0276128 | A1 | 10/2013 | Konetski et al. | |
| 2014/0068585 | A1* | 3/2014 | Young | G06F 21/572 |
| | | | | 717/168 |
| 2014/0137097 | A1 | 5/2014 | Sakai | |
| 2016/0162281 | A1* | 6/2016 | Hokiyama | G06F 8/65 |
| | | | | 717/173 |
| 2016/0234230 | A1* | 8/2016 | Rovniaguin | H04L 67/01 |
| 2016/0306978 | A1* | 10/2016 | Thadikaran | G06F 12/1441 |
| 2016/0366229 | A1 | 12/2016 | Yamaura | |
| 2017/0169219 | A1 | 6/2017 | Ogawa | |
| 2017/0295182 | A1* | 10/2017 | Teshler | H04W 12/10 |
| 2018/0102939 | A1* | 4/2018 | Kim | H04L 12/40169 |
| 2019/0104127 | A1* | 4/2019 | Da Silva Peixoto | |
| | | | | H04L 12/413 |
| 2019/0173912 | A1* | 6/2019 | Ujiie | H04L 12/40026 |
| 2019/0294800 | A1* | 9/2019 | Andrews | G06F 21/602 |
| 2021/0096847 | A1* | 4/2021 | Kamiguchi | B60W 60/001 |
| 2021/0405995 | A1* | 12/2021 | Sharma | H04L 67/303 |
| 2023/0247038 | A1* | 8/2023 | Haga | H04W 4/40 |
| | | | | 726/23 |

FOREIGN PATENT DOCUMENTS

| | | |
|---|---|---|
| JP | 2017-004220 A | 1/2017 |
| JP | 2017-111532 A | 6/2017 |

OTHER PUBLICATIONS

International Search Report with English translation and Written Opinion issued in corresponding application No. PCT/JP2019/050023 dated Feb. 4, 2020.

Chinese Office Action issued in CN counterpart application No. 201980084948.0 dated Jan. 23, 2024 (14 pages).

* cited by examiner

FIG.7

| VERIFICATION ID (1411) | COMMUNICATION TYPE (1412) | CORRESPONDING COMMUNICATION ID LIST (1413) |
|---|---|---|
| V1 | OCCURRENCE OF PROHIBITED OPERATION | {0 x 0 0 1、···} |
| V2 | OCCURRENCE OF SIGN OF ATTACK | {0 x 3 0 1、···} |
| ... | ... | ... |

FIG.9

| DEVICE STATUS ID 2821 | STATUS TYPE 2822 | NUMBER OF OCCURRENCES 2823 |
|---|---|---|
| D1 | AUTHENTICATION FAILURE | 1 |
| D2 | IMPOSSIBLE TO UPDATE | 0 |
| D3 | UPDATE STATUS FLAG ACCESS DENIAL | 0 |
| D4 | PRESENCE OF STATE VERIFICATION ABNORMALITY | 0 |
| D5 | UPDATE OF UPDATE STATUS FLAG | 1 |
| ... | ... | ... |

INFORMATION PROCESSING DEVICE

TECHNICAL FIELD

The present invention relates to an information processing device.

BACKGROUND ART

In recent years, in-vehicle systems mounted on automobiles are providing various services to users by connecting to servers and information processing devices outside the automobiles via communication lines such as the Internet, Bluetooth (registered trademark), and Wi-Fi. As a result, unlike conventional closed in-vehicle systems, it is becoming important to be prepared for a security cyber attack from the outside. Further, utilization of OSS (Open Source Software) and connection to information processing devices such as smartphones for which security is not secured are being considered for such in-vehicle systems. Therefore, a security cyber attack that exploits vulnerability is being concerned more than ever.

In general, it is considered effective in security countermeasures to protect the protection assets of the target system from design to operation based on three points of view of "prior countermeasures" in which countermeasures are considered at the design stage to reduce the risk of threats, "intrusion detection" in which threats to be exposed at the operation stage are detected, and "ex-post measures" in which damage caused by the exposed threats is minimized. In particular, it is important to be able to reliably detect the intrusion of a cyber attacker in order to appropriately perform the ex-post measures. As mechanisms for detecting illegal intrusion from the outside in general information systems, for example, IDS (Intrusion Detection System) and IPS (Intrusion Prevention System) are used.

Regarding security countermeasures for integrated production systems used in plants and factories, for example, the following technique of Patient Document 1 has been known. Patient Document 1 discloses a control device, in an integrated production system constructed in a plant, that specifies the target and type of a cyber attack on the basis of a detection result of detection means for detecting the cyber attack on the integrated production system and executes countermeasure means according to the specified target and type of the cyber attack.

PRIOR ART DOCUMENT

Patent Document

Patent Document 1: JP-2017-111532-A

SUMMARY OF INVENTION

Problems to be Solved by the Invention

In the technique of Patient Document 1, it is assumed that a cyber attack can be correctly detected, and whether or not appropriate ex-post measures according to an event can be executed depends on the detection accuracy of the cyber attack. Therefore, when a cyber attack is erroneously detected, even in a situation where ex-post measures are not originally required, the entire communication function is stopped or the system is shut down as the ex-post measures, and there is a risk of causing a large adverse effect on the availability of the system. In particular, it is necessary to maintain the automobile in a safe state as much as possible when an abnormality occurs in the in-vehicle system, and thus emergency measures such as a degenerate operation and an emergency stop are taken in many cases as the ex-post measures when the abnormality is detected. Therefore, in the case where the technique of Patent Document 1 is applied to an in-vehicle system and the false positive rate (FPR) for a cyber attack is high, even if no cyber attack actually occurs, the degenerate operation or the emergency stop is frequently executed, and there is a risk of causing an adverse effect that the availability of the vehicle is largely reduced.

The present invention has been made in view of the above problems, and the object thereof is to safely protect a system controlled by using an information processing device from a cyber attack while suppressing adverse effects due to erroneous detection.

Means for Solving the Problems

An information processing device according to the present invention can update software, and includes: a storage unit that stores control information for controlling whether or not the software can be updated; a communication unit that receives a communication message transmitted from another information processing device connected thereto via a communication line; an update control unit that updates the control information on the basis of the communication message received by the communication unit; and an update propriety determination unit that determines whether or not the software can be updated on the basis of the control information.

Advantageous Effects of the Invention

According to the present invention, it is possible to safely protect a system controlled by using an information processing device from a cyber attack while suppressing adverse effects due to erroneous detection.

BRIEF DESCRIPTION OF THE DRAWINGS

FIG. 7 is a diagram for showing an example of a data structure of communication verification information.

FIG. 9 is a diagram for showing an example of a data structure of device status information.

MODES FOR CARRYING OUT THE INVENTION

Hereinafter, embodiments of the present invention will be described in detail with reference to the drawings.

The following embodiments describe an example of a method in which an information processing device that is mounted on a vehicle and can update software updates a flag indicating whether or not the software can be updated, on the basis of a specific communication message received from another information processing device, and determines whether or not the software can be updated on the basis of the flag. However, the technical idea of the present invention is not limited to this example. Note that it is preferable to use a secure communication path using encryption technology or the like in communications between each device and the outside of the vehicle. In addition, it is preferable that a key and a seed for encryption used in each device are securely distributed, managed, and updated, and may be distributed and updated at an optional timing such as at the time of start/stop of the engine, development of the product, or maintenance.

First Embodiment

Figure 1:
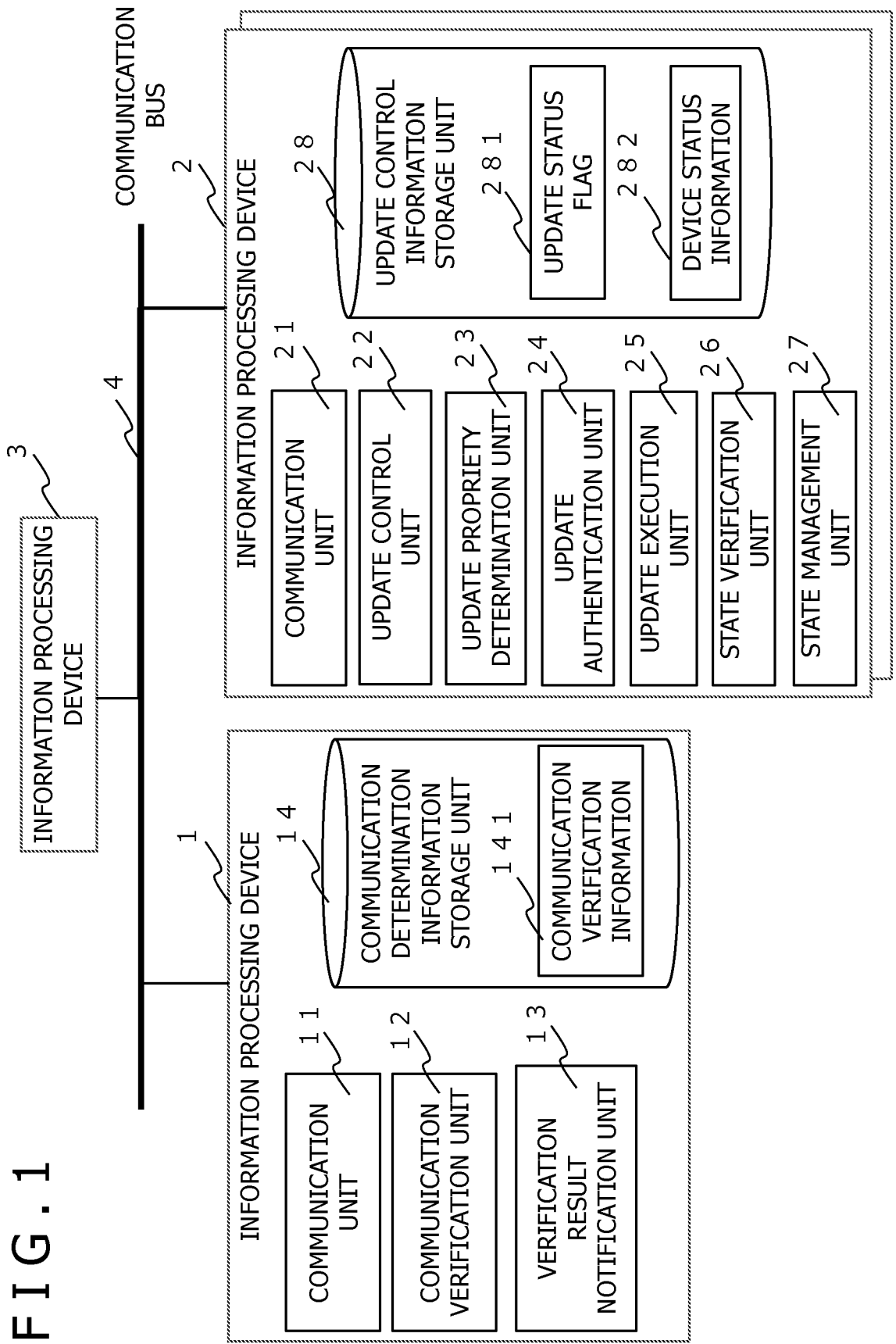
FIG. 1 is a diagram for showing a configuration of a security system for software update control according to a first embodiment of the present invention.

FIG. 1 is a diagram for showing a configuration of a security system for software update control according to a first embodiment of the present invention. The security system for software update control of FIG. 1 is configured in such a manner that one or more information processing device 1, information processing device 2, and information processing device 3 are connected to each other via a communication bus 4. Note that the information processing devices 1, 2, and 3 are, for example, ECUs (Electronic Control Units) mounted on a vehicle, and are also connected to other devices via the communication bus 4 in the vehicle. However, the communication bus 4 is physically configured using plural communication buses, and the standards of these communication buses may be the same or different from each other. The standards of these communication buses are, for example, CAN (registered trademark), LIN (registered trademark), FlexRay (registered trademark), Ethernet (registered trademark), and the like.

Each of the information processing devices 1, 2, and 3 includes a CPU, a ROM, and a RAM, which are not shown, and the CPU expands a program stored in the ROM to the RAM and executes the program to realize each of the following functions.

The information processing device 1 includes, as the functions thereof, a communication unit 11, a communication verification unit 12, and a verification result notification unit 13. In addition, a communication determination information storage unit 14 configured using a recording medium such as a flash memory is provided.

The communication unit 11 receives a communication message transmitted from another information processing device via the communication bus 4, and transmits the communication message to another information processing device via the communication bus 4. As described above, since the communication bus 4 is physically configured using plural communication buses, the communication unit 11 has connection ports the number of which is the same as that of the physical communication buses.

The communication verification unit 12 verifies the communication message received by the communication unit 11, and when an event requiring any ex-post measure occurs in the system, this is detected. For example, on the basis of the communication message received by the communication unit 11, when a sign of an illegal cyber attack occurs, this is detected. Specifically, for example, an event caused by a cyber attack such as address scanning, port scanning, illegal message reception, illegal file generation, or illegal process activation is detected as a sign of a cyber attack. In addition, when the communication unit 11 receives a communication message indicating that the occurrence of a prohibited operation has been detected in another information processing device, the occurrence of the prohibited operation is detected on the basis of the communication message. For example, when a software update request is made in a state where a software update is prohibited, this is detected as a prohibited operation.

The verification result notification unit 13 notifies another information processing device of the verification result of the communication message by the communication verification unit 12. For example, when a sign of an illegal cyber attack is detected by the communication verification unit 12, a predetermined communication message is transmitted to another information processing device by using the communication unit 11, thereby notifying another information processing device of the occurrence of the sign of the cyber attack and issuing an instruction about an ex-post measure such as prohibition of the software update. In addition, when the communication verification unit 12 detects the occurrence of a prohibited operation, a predetermined communication message is transmitted to another information processing device by using the communication unit 11, thereby notifying another information processing device of the occurrence of the prohibited operation and issuing an instruction about an ex-post measure such as a degenerate operation or an emergency stop.

The communication determination information storage unit 14 stores communication verification information 141 used to verify the received communication message by the communication verification unit 12. The communication verification unit 12 verifies the communication message by referring to the communication verification information 141.

The information processing device 2 includes, as the functions thereof, a communication unit 21, an update control unit 22, an update propriety determination unit 23, an update authentication unit 24, an update execution unit 25, a state verification unit 26, and a state management unit 27. In addition, an update control information storage unit 28 configured using a recording medium such as a flash memory is provided.

The communication unit 21 receives a communication message transmitted from another information processing device via the communication bus 4, and transmits the communication message to another information processing device via the communication bus 4. As described above, since the communication bus 4 is physically configured using plural communication buses, the communication unit 21 has connection ports the number of which is the same as that of the physical communication buses.

The update control unit 22 updates an update status flag 281 stored in the update control information storage unit 28, on the basis of the communication message received by the communication unit 21. The update status flag 281 is flag information for controlling whether or not the software of the information processing device 2 can be updated.

The update propriety determination unit 23 determines whether or not the software can be updated, on the basis of the update status flag 281.

When the communication unit 21 receives a predetermined authentication request message as a communication message from another information processing device, the update authentication unit 24 executes an authentication process of the information processing device. For example, it is determined whether or not the authentication request message is correct by confirming whether or not the authentication request message has been transmitted according to a regular software update protocol.

The update execution unit 25 executes the software update of the information processing device 2. For example, the software is updated by executing a process based on the UDS (Unified Diagnosis Services, ISO 14229) protocol.

The state verification unit 26 verifies whether or not the information processing device 2 is affected by an illegal cyber attack at an optional timing. As the timing of the state verification, for example, the time when the vehicle starts or the time when the communication unit 21 receives a predetermined communication message is set. In addition, the state verification may be repeatedly executed at a predetermined cycle.

The state management unit 27 manages the state of the information processing device 2 by using the update status flag 281 and device status information 282 stored in the update control information storage unit 28.

The update control information storage unit 28 stores the update status flag 281 indicating the state of whether or not the software can be updated in the information processing device 2 and the device status information 282 indicating the state of the information processing device 2. The update propriety determination unit 23 determines whether or not the software can be updated by referring to the update status flag 281.

The information processing device 3 is connected to the information processing devices 1 and 2, and transmits and receives various communication messages to and from the information processing devices 1 and 2 via the communication bus 4. Note that the information processing device 3 may have the same function as either the information processing device 1 or 2. Alternatively, the information processing device 3 may have the functions of both of the information processing devices 1 and 2.

Figure 2:
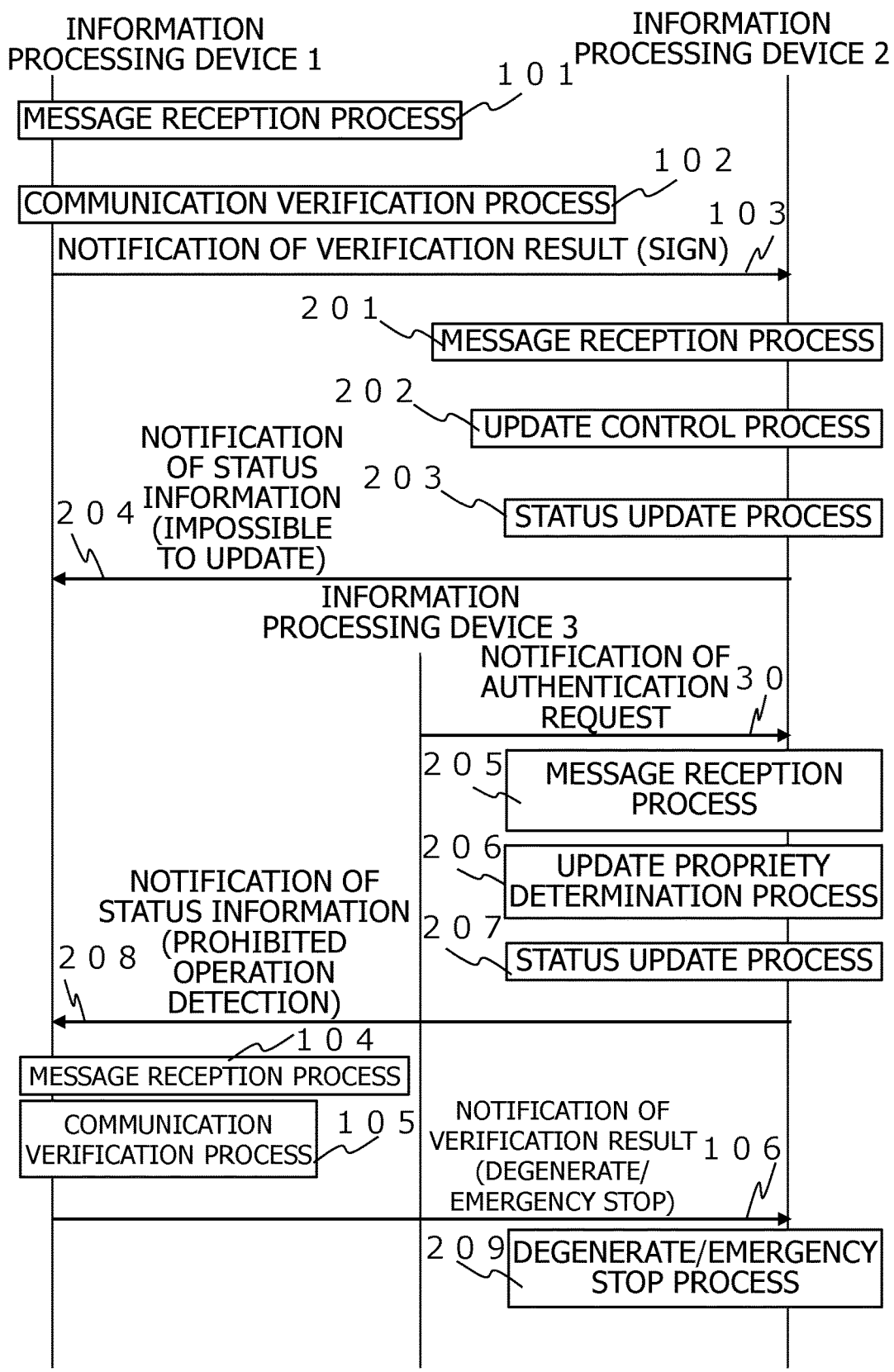
FIG. 2 is a diagram for showing an example of an entire processing sequence in the security system for software update control according to the first embodiment of the present invention.

FIG. 2 is a diagram for showing an example of an entire processing sequence in the security system for software update control according to the first embodiment of the present invention. Note that the execution subject of each step to be described below is a CPU, which is not shown, provided in each information processing device.

In Step 101, the information processing device 1 allows the communication unit 11 to receive a communication message transmitted from another information processing device via the communication bus 4.

In Step 102, the information processing device 1 allows the communication verification unit 12 to verify the communication message received in Step 101. Here, it is verified whether or not the received communication message indicates the occurrence of a prohibited operation or the occurrence of a sign of a cyber attack. In the example of FIG. 2, the sign of the cyber attack is detected in Step 102 from the communication message received in Step 101, and it is decided to prohibit the software update as an ex-post measure thereagainst.

In Step 103, the information processing device 1 allows the verification result notification unit 13 to notify another information processing device of the verification result in Step 102 via the communication bus 4. In the example of FIG. 2, a predetermined communication message for instruction to prohibit the software update decided as an ex-post measure against the sign of the cyber attack in Step 102 is transmitted to the information processing device 2 by using the communication unit 11.

In Step 201, the information processing device 2 allows the communication unit 21 to receive, via the communication bus 4, the communication message transmitted from the information processing device 1 in Step 103, that is, the communication message instructing to prohibit the software update as an ex-post measure against the occurrence of the sign of the cyber attack.

In Step 202, the information processing device 2 allows the state management unit 27 to confirm the update status flag 281 stored in the update control information storage unit 28, and determines whether or not the software can be updated. In the example of FIG. 2, it is assumed that the update status flag 281 has not been updated and indicates "update permission" that is a status of permitting the software update.

In Step 203, the information processing device 2 allows the update control unit 22 to update the status of the information processing device 2 on the basis of the communication message received in Step 201 and the confirmation result of the update status flag 281 in Step 202. In the example of FIG. 2, since the received communication message is a communication message indicating the occurrence of the sign of the cyber attack and the update status flag 281 has not been updated, the update status flag 281 is accordingly changed. As a result, the status of the information processing device 2 is updated from "update permission" that is a status of permitting the software update to "impossible to update" that is a status of not permitting the update.

In Step 204, the information processing device 2 allows the state management unit 27 to notify another information processing device of the current status of the information processing device 2 via the communication bus 4 on the basis of the contents of the update status flag 281 and the device status information 282 stored in the update control information storage unit 28. In the example of FIG. 2, a predetermined communication message for notifying the information processing device 1 that the status of the information processing device 2 is "impossible to update" is transmitted to the information processing device 1 by using the communication unit 11, according to the update status flag 281 changed in Step 203.

In Step 30, the information processing device 3 transmits a predetermined communication message for notifying the information processing device 2 of an authentication request to the information processing device 2, according to a regular software update protocol, thereby instructing the information processing device 2 to update the software.

In Step 205, the information processing device 2 allows the communication unit 21 to receive, via the communication bus 4, the communication message of the authentication request transmitted from the information processing device 3 in Step 30.

In Step 206, the information processing device 2 allows the update propriety determination unit 23 to determine whether or not the software can be updated, on the basis of the update status flag 281 stored in the update control information storage unit 28. In the example of FIG. 2, since the update status flag 281 has been changed to "impossible to update" in Step 203, the update instruction for the software indicated by the notification message received from the information processing device 3 in Step 205 is detected as the occurrence of the prohibited operation, and it is determined that the software cannot be updated.

In Step 207, the information processing device 2 allows the state management unit 27 to update the status of the information processing device 2 on the basis of the determination result in Step 206. In the example of FIG. 2, the occurrence of the prohibited operation is detected in Step 206, and it is accordingly determined that the software cannot be updated. The status of the information processing device 2 is updated by reflecting such a determination result on the device status information 282.

In Step 208, the information processing device 2 allows the state management unit 27 to notify another information processing device of the current status of the information processing device 2 via the communication bus 4 on the basis of the contents of the update status flag 281 and the device status information 282 stored in the update control information storage unit 28. In the example of FIG. 2, a predetermined communication message for notifying the information processing device 1 that the information processing device 2 has detected the occurrence of the prohibited operation is transmitted to the information processing device 1 by using the communication unit 21, according to the device status information 282 changed in Step 207.

In Step 104, the information processing device 1 allows the communication unit 11 to receive, via the communication bus 4, the communication message transmitted from the information processing device 2 in Step 208.

In Step 105, the information processing device 1 allows the communication verification unit 12 to verify the communication message received in Step 104. Here, as similar to Step 102, it is verified whether or not the received communication message indicates the occurrence of the prohibited operation or the occurrence of the sign of the cyber attack. In the example of FIG. 2, the occurrence of the prohibited operation is detected in Step 105 from the communication message received in Step 104, and it is decided to perform a degenerate operation or an emergency stop as an ex-post measure.

In Step 106, the information processing device 1 allows the verification result notification unit 13 to notify another information processing device of the verification result in Step 105 via the communication bus 4. In the example of FIG. 2, a predetermined communication message for instruction about the degenerate operation or the emergency stop decided as an ex-post measure against the prohibited operation in Step 105 is transmitted to the information processing device 2 by using the communication unit 11.

In Step 209, the information processing device 2 receives the communication message transmitted from the information processing device 1 in Step 106 via the communication bus 4, and shifts to a predetermined control mode for performing the degenerate operation or the emergency stop of the vehicle on the basis of the communication message.

In the security system for software update control of the embodiment, the software update in the information processing device 2 is prohibited when the sign of the illegal cyber attack against the security is detected by each of the above steps. Further, when an operation related to the software update is detected in the prohibition period, the information processing device 2 executes the emergency measure such as the degenerate operation or the emergency stop, and the automobile can be maintained in a safe state.

Next, the processing sequence of FIG. 2 will be described below in detail with reference to FIG. 3 to FIG. 5 and FIG. 7 to FIG. 9.

Figure 3:
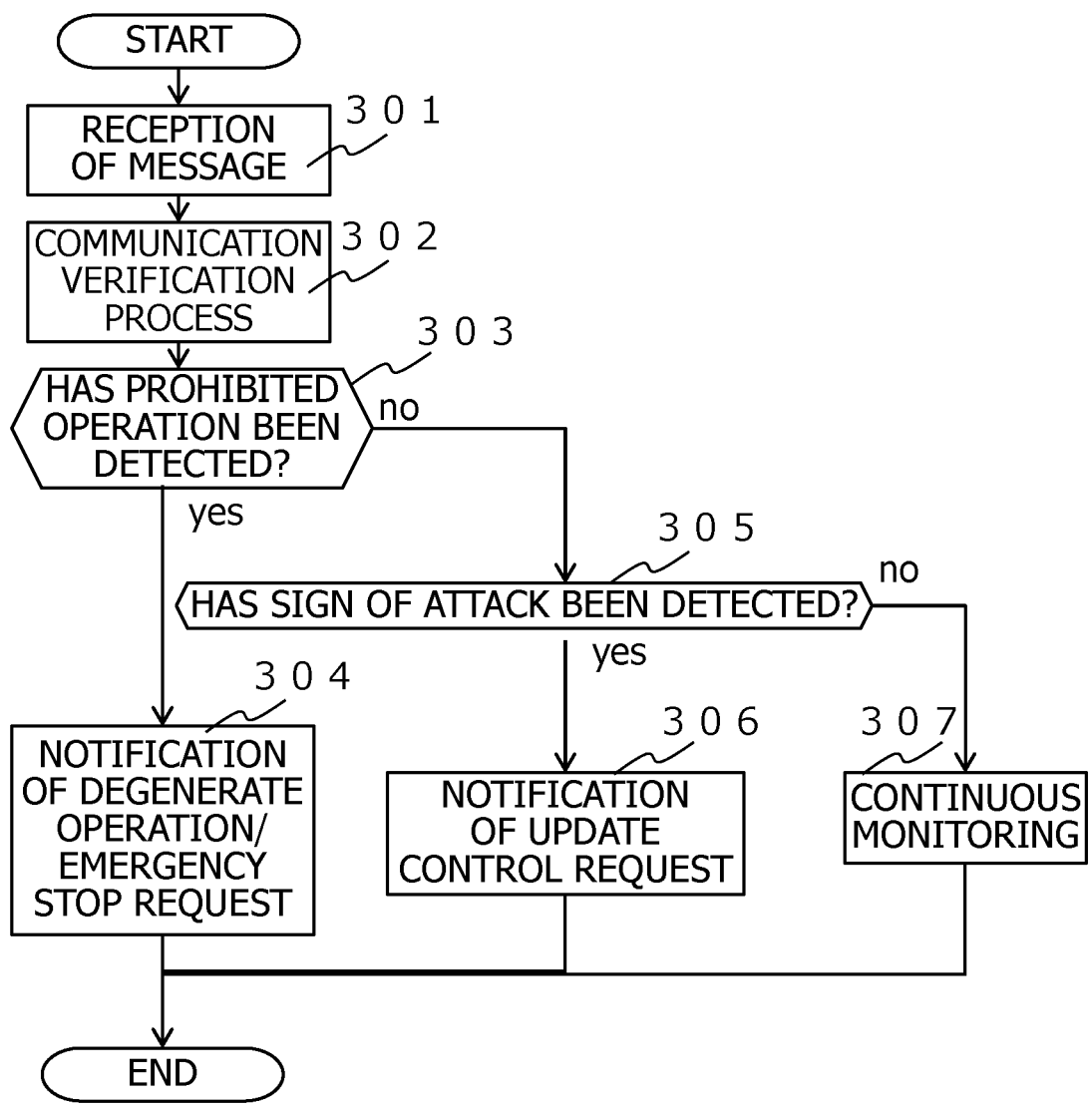
FIG. 3 is a flowchart of a communication monitoring identification process.

FIG. 3 is a flowchart of a communication monitoring identification process executed by the information processing device 1 in Step 101 to Step 105 of FIG. 2.

In Step 301, the information processing device 1 allows the communication unit 11 to receive the communication message transmitted from another information processing device via the communication bus 4 as described in Steps 101 and 104 of FIG. 2.

In Step 302, the information processing device 1 allows the communication verification unit 12 to verify the communication message received in Step 301, on the basis of the communication verification information 141 stored in the communication determination information storage unit 14 as described in Steps 102 and 105 of FIG. 2. That is, it is verified whether or not the received communication message corresponds to "occurrence of a prohibited operation" or "occurrence of a sign of a cyber attack."

FIG. 7 is a diagram for showing an example of a data structure of the communication verification information 141 used for verification of the communication message by the communication verification unit 12 in Step 302. As shown in FIG. 7, the communication verification information 141 includes, for example, a verification ID 1411, a communication type 1412, and a corresponding communication ID list 1413. The verification ID 1411 is information for identifying each record configuring the communication verification information 141, and a unique value is set for each record. The communication type 1412 is information indicating the type of the communication message, and indicates what kind of event the communication message to be verified corresponds to. The corresponding communication ID list 1413 is information indicating a list of communication IDs each of which is included in the communication message.

The communication verification unit 12 can determine what kind of event the received communication message corresponds to by checking these pieces of information included in the communication verification information 141 against the communication message received by the communication unit 11. For example, when the value of the communication ID in the communication message received in Step 301 is "0×001," this value is included in the corresponding communication ID list 1413 in the record in which the value of the verification ID 1411 is "V1." Thus, on the basis of the contents of the communication type 1412 associated with this record, it can be determined that the received communication message indicates "occurrence of a prohibited operation" and the software update request has been made in a state where the software update is prohibited.

Returning to the description of FIG. 3, in Step 303, the communication verification unit 12 determines whether or not the prohibited operation has been detected on the basis of the verification result of the communication message, the verification being performed in Step 302. If the prohibited operation has been detected, the process proceeds to Step 304, and Step 305 otherwise.

In Step 304, the information processing device 1 allows the verification result notification unit 13 to send a notification requesting to shift to the degenerate operation or the emergency stop as an ex-post measure against the prohibited operation detected in Step 302. Here, as described in Step 106 of FIG. 2, the communication unit 11 transmits a predetermined communication message for instruction about the degenerate operation or the emergency stop via the communication bus 4, thereby instructing each of the other information processing devices to take an ex-post measure against the prohibited operation.

In Step 305, the communication verification unit 12 determines whether or not the sign of the illegal cyber attack has been detected on the basis of the verification result of the communication message, the verification being performed in Step 302. If the sign of the attack has been detected, the process proceeds to Step 306 and Step 307 otherwise.

In Step 306, the information processing device 1 allows the verification result notification unit 13 to send a notification requesting for predetermined update control as an ex-post measure against the sign of the cyber attack detected in Step 302. Here, as described in Step 103 of FIG. 2, the communication unit 11 transmits a predetermined communication message (update control request message) for instruction about prohibition of the software update via the communication bus 4, thereby instructing each of the other information processing devices to take an ex-post measure against the sign of the attack.

In Step 307, the communication verification unit 12 shifts to a continuous monitoring state in which the communication message received by the communication unit 11 is continuously monitored.

When any one of Steps 304, 306, and 307 is executed, the information processing device 1 terminates the process of FIG. 3.

By the above process, the information processing device 1 can verify the received communication message, and can notify another information processing device of the ex-post measure according to the event on the basis of the verification result. Note that the information processing device 1 may include the information processing device 1 itself as a notification destination of the verification result. In addition, events other than the sign of the attack and the prohibited operation may be included in the communication type 1412 in the communication verification information 141 such that the communication verification unit 12 can verify these events as events requiring ex-post measures.

Figure 4:
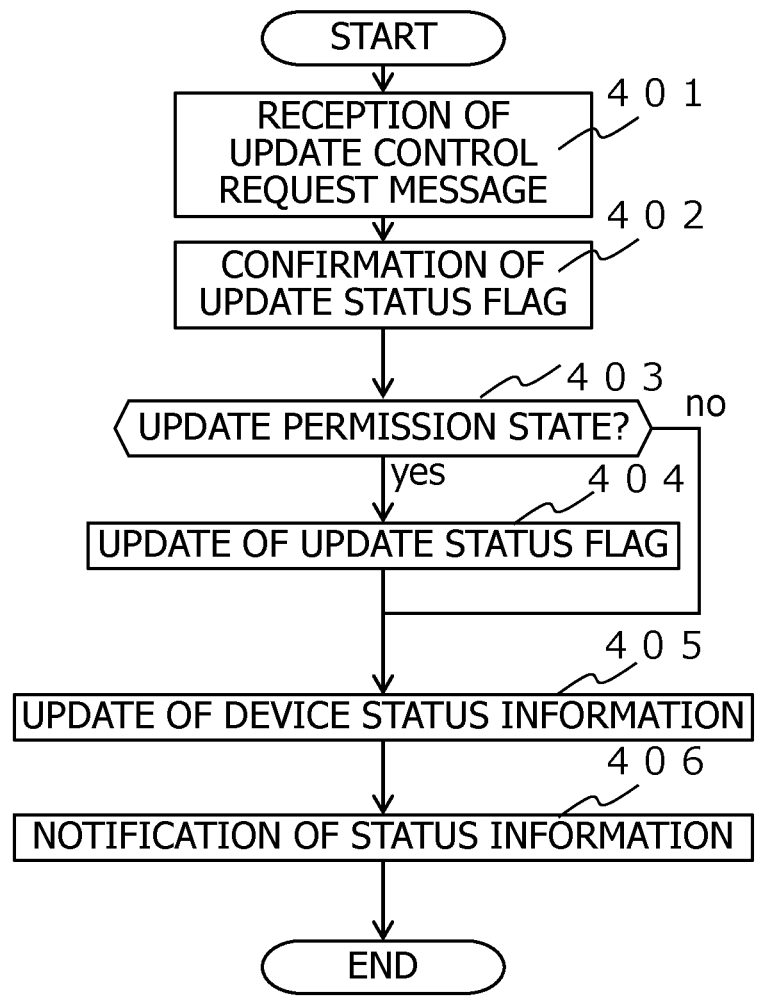
FIG. 4 is a flowchart of a status update process.

FIG. 4 is a flowchart of a status update process executed by the information processing device 2 in Step 201 to Step 204 of FIG. 2.

In Step 401, as described in Step 201 of FIG. 2, the information processing device 2 allows the communication unit 21 to receive the update control request message transmitted from the information processing device 1 via the communication bus 4, that is, the communication message requesting for prohibition of the software update by updating the update status flag 281.

In Step 402, as described in Step 202 of FIG. 2, the information processing device 2 allows the state management unit 27 to confirm the update status flag 281 stored in the update control information storage unit 28, and determines whether or not the software can be updated.

Figure 8:
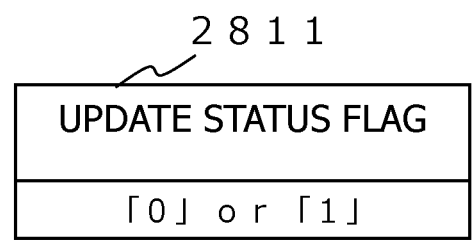
FIG. 8 is a diagram for showing an example of a data structure of an update status flag.

FIG. 8 is a diagram for showing an example of a data structure of the update status flag 281 confirmed by the state management unit 27 in Step 402. As shown in FIG. 8, the update status flag 281 includes, for example, a flag value 2811. The flag value 2811 is information indicating whether the software update is permitted or prohibited. When the flag value 2811 is "0," the software update is permitted, that is, the status of the information processing device 2 indicates "update permission," and when the flag value is "1," the software update is prohibited, that is, the status of the information processing device 2 indicates "impossible to update."

The state management unit 27 can determine the status of whether or not the software can be updated in the information processing device 2 by confirming the information included in the update status flag 281. That is, when the flag value 2811 is "0," it can be determined that the software update is permitted, and when the flag value is "1," it can be determined that the software update is prohibited.

Returning to the description of FIG. 4, in Step 403, the information processing device 2 determines whether the status of the information processing device 2 is "update permission" or "impossible to update," on the basis of the latest update status flag 281 confirmed in Step 402. That is, when the flag value 2811 is "0," the process proceeds to Step 404 by determining as "update permission," and when the flag value 2811 is "1," the process proceeds to Step 405 by determining as the impossible-to-update state. Thus, even if the communication unit 21 receives the update control request message as a communication message, when the flag value 2811 of the update status flag 281 has been updated from "0" to "1" by executing the following Step 404 in the information processing device 2 in the past, the update status flag 281 is not updated without executing Step 404.

In Step 404, the information processing device 2 allows the update control unit 22 to update the update status flag 281. Here, by updating the flag value 2811 of the update status flag 281 from "0" to "1," the status of the information processing device 2 indicated by the update status flag 281 is changed from "update permission" to "impossible to update" as described in Step 203 of FIG. 2.

In Step 405, the information processing device 2 allows the update control unit 22 to update the device status information 282. Here, a log is recorded in the device status information 282, according to the determination result in Step 403.

FIG. 9 is a diagram for showing an example of a data structure of the device status information 282 in which the update control unit 22 records a log in Step 405. As shown in FIG. 9, the device status information 282 includes, for example, a device status ID 2821, a status type 2822, and the number of occurrences 2823. The device status ID 2821 is information for identifying each record configuring the device status information 282, and a unique value is set for each record. The status type 2822 is information indicating a status type, and indicates what kind of state the information processing device 2 is in. The number of occurrences 2823 is information indicating the number of occurrences of the status. Note that other information, for example, supplementary information such as time information and detection points may be added to the device status information 282.

The update control unit 22 rewrites information according to the determination result in Step 403 among those included in the device status information 282, thereby recording the processing result of the update control request from the information processing device 1 as a log. For example, in the case of being determined as "update permission" in Step 403, the update status flag 281 is updated in Step 404, so that the status of the information processing device 2 is changed from "update permission" to "impossible to update." In this case, the record in which the status type 2822 indicates "update of update status flag," that is, the record in which the device status ID 2821 is "D5" is specified, and a value obtained by adding "1" to the value of the number of occurrences 2823 of this record is registered. On the other hand, in the case of being determined as "impossible to update" in Step 403, the update status flag 281 is not updated without executing Step 404. In this case, the record in which the status type 2822 indicates "update status flag access denial," that is, the record in which the device status ID 2821 is "D3" is specified, and a value obtained by adding "1" to the value of the number of occurrences 2823 of this record is registered.

Returning to the description of FIG. 4, in Step 406, the information processing device 2 allows the state management unit 27 to transmit optional information indicating the current status of the information processing device 2 to the information processing device 1 via the communication bus 4 on the basis of the update status flag 281 updated when executing Step 404 and the device status information 282 updated in Step 405 as described in Step 204 of FIG. 2. For example, as the optional information, only the value of the update status flag 281 may be transmitted, or a part of the device status information 282 may be transmitted.

After Step 406 is executed, the information processing device 2 terminates the process of FIG. 4.

By the above process, the information processing device 2 can update the contents of the update status flag 281 for controlling whether or not the software can be updated, on the basis of the verification result notified from the information processing device 1. In addition, after the update status flag 281 is updated at least once, the state of the update status flag 281 can be maintained as it is.

Figure 5:
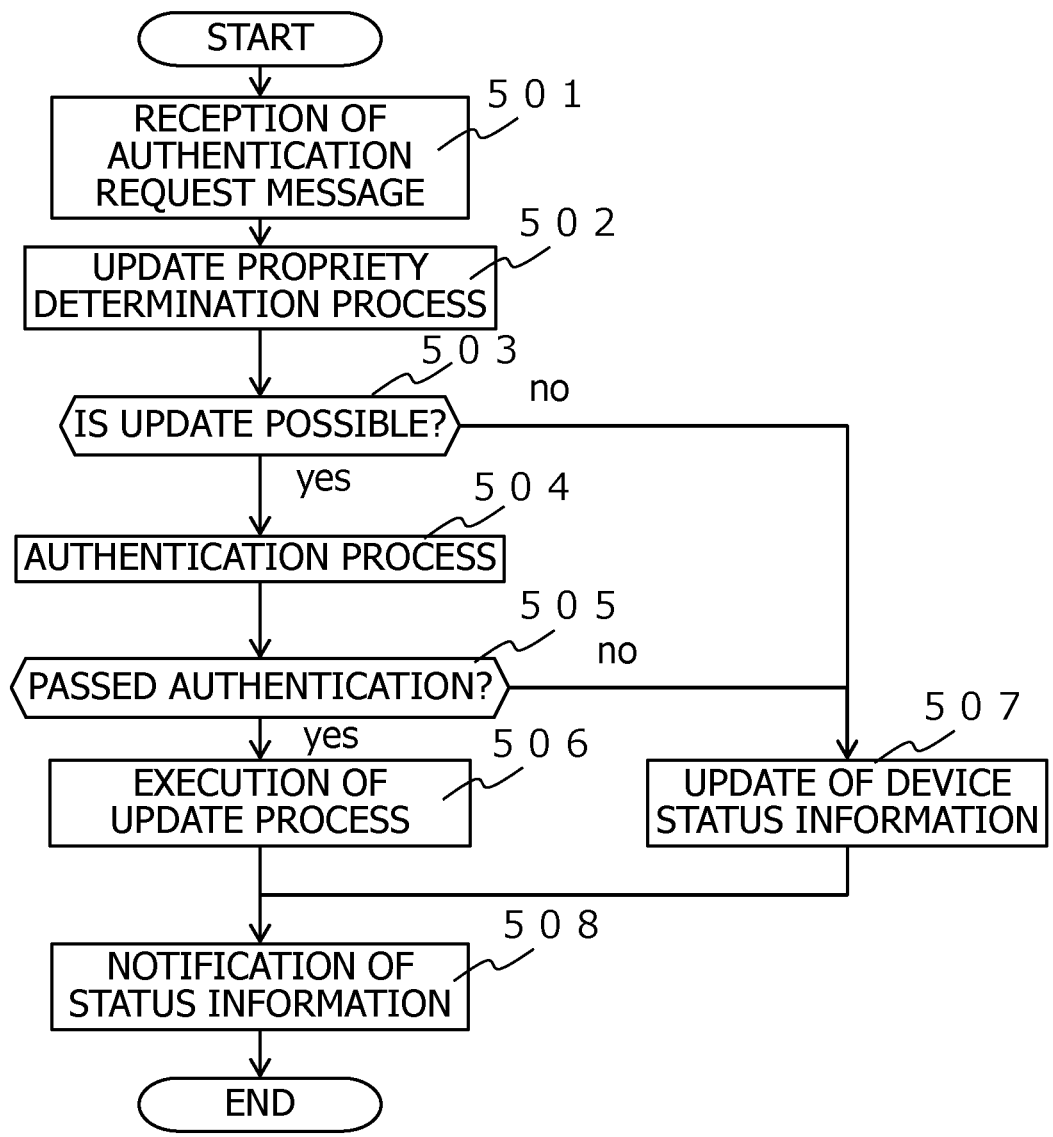
FIG. 5 is a flowchart of a software update control process.

FIG. 5 is a flowchart of a software update control process executed by the information processing device 2 in Step 205 to Step 208 of FIG. 2.

In Step 501, as described in Step 205 of FIG. 2, the information processing device 2 allows the communication unit 21 to receive a predetermined communication message (authentication request message) transmitted from the information processing device 3 via the communication bus 4 as a communication message for instruction about the software update.

In Step 502, as described in Step 206 of FIG. 2, the information processing device 2 allows the update propriety determination unit 23 to refer to the update status flag 281 stored in the update control information storage unit 28, and determines whether or not the software can be updated, on the basis of the reference. For example, if the flag value 2811 is "0" by referring to the flag value 2811 in the update status flag 281 of FIG. 8, it is determined that the software update is permitted. That is, if the flag value 2811 of the update status flag 281 has never been updated from "0" to "1" by the update control unit 22 in Step 404, it is determined that the software update is permitted. On the other hand, if the flag value 2811 is "1," it is determined that the software update is not permitted. That is, if the flag value 2811 of the update status flag 281 has been updated from "0" to "1" at least once by the update control unit 22 in Step 404, it is determined that the software update is not permitted.

In Step 503, the information processing device 2 allows the update propriety determination unit 23 to determine whether or not the software can be updated, on the basis of the determination result in Step 502. If it is determined in Step 502 that the software update is permitted, the process proceeds to Step 504 by determining that the software can be updated. On the other hand, if it is determined in Step 502 that the software update is not permitted, the process proceeds to Step 507 by determining that the software cannot be updated.

In Step 504, the information processing device 2 allows the update authentication unit 24 to perform an authentication process for the information processing device 3 that has requested authentication using the authentication request message received by the communication unit 21 in Step 501. As the authentication process at this time, an optional process can be executed. For example, one or more processes among device authentication, authentication of the received message, signature verification, and the like can be performed as the authentication process.

In Step 505, the information processing device 2 allows the update authentication unit 24 to determine whether or not the information processing device 3 has passed the authentication, on the basis of the result of the authentication process performed in Step 504. When the information processing device 3 has been authorized as a regular device in the authentication process, it is determined to have passed the authentication, and the process proceeds to Step 506. Otherwise, it is determined to have not passed the authentication, and the process proceeds to Step 507.

In Step 506, the information processing device 2 allows the update execution unit 25 to execute a software update process on the basis of a predetermined procedure. When the software update is completed in Step 506, the process proceeds to Step 508.

In Step 507, the information processing device 2 allows the state management unit 27 to update the device status information 282 on the basis of the determination result in Step 503 or Step 505. For example, when it is determined in Step 503 that the software cannot be updated, the record in which the status type 2822 indicates "impossible to update," that is, the record in which the device status ID 2821 is "D2" is specified in the device status information 282 of FIG. 9, and a value obtained by adding "1" to the value of the number of occurrences 2823 of this record is registered. In addition, for example, when it is determined in Step 505 that the information processing device 3 has not passed the authentication, the record in which the status type 2822 indicates "authentication failure," that is, the record in which the device status ID 2821 is "D1" is specified in the device status information 282 of FIG. 9, and a value obtained by adding "1" to the value of the number of occurrences 2823 of this record is registered. When the device status information 282 is updated in Step 507, the process proceeds to Step 508.

In Step 508, as described in Step 207 of FIG. 2, the information processing device 2 allows the state management unit 27 to transmit optional information indicating the current status of the information processing device 2 to the information processing device 1 via the communication bus 4 on the basis of the update status flag 281 and the device status information 282. Here, as similar to Step 406 of FIG. 4, for example, as the optional information, only the value of the update status flag 281 may be transmitted, or a part of the device status information 282 may be transmitted.

After Step 508 is executed, the information processing device 2 terminates the process of FIG. 5.

By the above process, the information processing device 2 can determine whether or not the software can be updated, on the basis of the update status flag 281 in response to the software update instruction from the information processing device 3.

Next, a process for restoring the updated update status flag 281 will be described. In the process of FIG. 4, after the update status flag 281 is updated at least once in the information processing device 2, the state of the update status flag 281 is maintained as it is, so that the software update remains prohibited. Hereinafter, with reference to a flowchart of a status recovery process shown in FIG. 6, a case in which it is verified whether or not the information processing device 2 is affected by a cyber attack at an optional timing, and if not affected by the cyber attack, the update status flag 281 is restored to permit the software update again will be described.

In Step 601, the information processing device 2 detects a request for state verification. For example, when the vehicle starts or when a predetermined communication message transmitted from the information processing device 1 via the communication bus 4 is received by the communication unit 21, it is determined that the request for state verification has been made at an optional timing such as a fixed cycle, and this is detected.

In Step 602, the information processing device 2 allows the state verification unit 26 to verify whether or not the information processing device 2 is affected by an illegal cyber attack in response to the request for state verification detected in Step 601. Here, for example, a predetermined secure boot process is executed to verify that the information processing device 2 has not been falsified, thereby verifying the presence or absence of an influence of the cyber attack.

In Step 603, the information processing device 2 determines the presence or absence of an abnormality in the information processing device 2 on the basis of the verification result, the verification being performed in Step 602. If it can be confirmed by the verification of Step 602 that the information processing device 2 has not been falsified, it is determined as "absence of abnormality" and the process proceeds to Step 604, and if not, it is determined as "presence of abnormality" and the process proceeds to Step 605.

In Step 604, the information processing device 2 allows the update control unit 22 to update the update status flag 281. Here, by updating the flag value 2811 of the update status flag 281 from "1" to "0," the status of the information processing device 2 indicated by the update status flag 281 is returned from "impossible to update" that is the state updated in Step 404 of FIG. 4 to "update permission" that is the state before the update. However, when the flag value 2811 of the update status flag 281 is "0," the flag value is left as it is without updating.

In Step 605, the information processing device 2 allows the update control unit 22 to update the device status information 282. Here, a log is recorded in the device status information 282, according to the determination result in Step 603. For example, in the case of being determined as "absence of abnormality" in Step 603, the update status flag 281 is updated in Step 604, so that the status of the information processing device 2 is changed from "impossible to update" to "update permission." In this case, the record in which the status type 2822 indicates "update of update status flag," that is, the record in which the device status ID 2821 is "D5" is specified, and a value obtained by adding "1" to the value of the number of occurrences 2823 of this record is registered. On the other hand, if it is determined as "presence of abnormality" in Step 603, the record in which the status type 2822 indicates "presence of state verification abnormality," that is, the record in which the device status ID 2821 is "D4" is specified, and a value obtained by adding "1" to the value of the number of occurrences 2823 of this record is registered.

In Step 606, the information processing device 2 allows the state management unit 27 to transmit optional information indicating the current status of the information processing device 2 to the information processing device 1 via the communication bus 4 on the basis of the update status flag 281 and the device status information 282. Here, as similar to Step 406 of FIG. 4 and Step 508 of FIG. 5, for example, as the optional information, only the value of the update status flag 281 may be transmitted, or a part of the device status information 282 may be transmitted.

Figure 6:
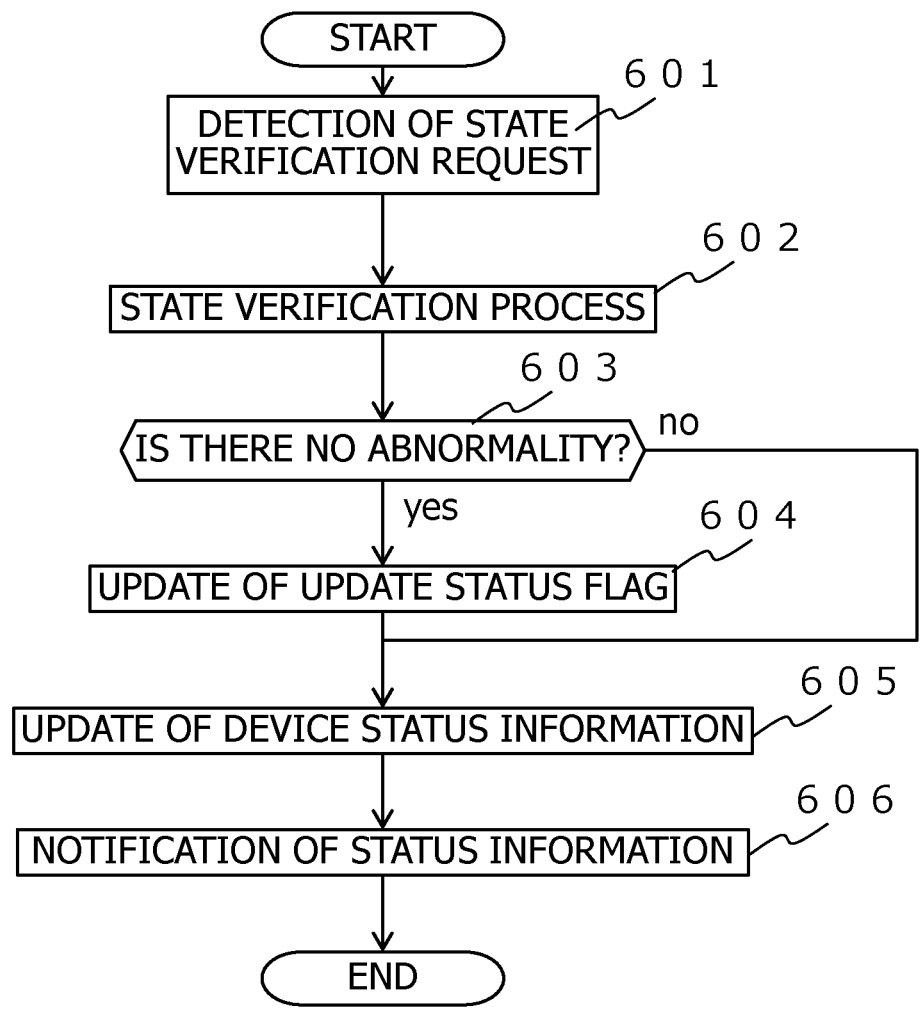
FIG. 6 is a flowchart of a status recovery process.

After Step 606 is executed, the information processing device 2 terminates the process of FIG. 6.

By the above process, the information processing device 2 can verify whether or not the information processing device 2 is affected by the cyber attack at an optional timing, and can determine whether or not to permit the software update again, according to the verification result.

According to the first embodiment described above, for example, when the information processing device 2 is an ECU of a vehicle control system, the security system for software update control can effectively cope with a cyber attack targeting the ECU. That is, the information processing device 2 allows, apart from the update authentication unit 24 that performs the software update authentication, the update control unit 22 and the update propriety determination unit 23 to prohibit the software update at a stage where a sign of a cyber attack is detected by using the update status flag 281 stored in the update control information storage unit 28. In addition, when a prohibited operation such as a software update instruction is detected during a period in which the software update is prohibited, the information processing device 2 shifts to an emergency measure such as a degenerate operation or an emergency stop. Accordingly, even if a regular software update protocol is broken by a cyber attacker, an illegal software update can be prevented. In addition, even if the sign of the cyber attack is erroneous detection, only the software update cannot be temporarily performed, and the automobile can be maintained in a safe state without affecting the driving control.

According to the first embodiment of the present invention described above, the following effects can be exhibited.

(1) The information processing device 2 that can update software includes the update control information storage unit 28 that stores the update status flag 281 as control information for controlling whether or not the software can be updated, the communication unit 21 that receives the communication messages transmitted from the other information processing devices 1 and 3 connected thereto via the communication bus 4, the update control unit 22 that updates the update status flag 281 on the basis of the communication messages received by the communication unit 21, and the update propriety determination unit 23 that determines whether or not the software can be updated, on the basis of the update status flag 281. Accordingly, it is possible to safely protect a system of an automobile or the like controlled by using the information processing device 2 from a cyber attack while suppressing adverse effects due to erroneous detection.

(2) The update control unit 22 updates the update status flag 281 (Step 404) when the communication unit 21 receives, as the communication message, the predetermined update control request message requesting for an update of the update status flag 281 from the other information processing device 1 (Step 401). Accordingly, the update status flag 281 can be updated at an appropriate timing.

(3) The update control unit 22 does not update the update status flag 281 when the update status flag 281 has been updated (Step 403: No) even when the communication unit 21 receives the update control request message as the communication message. Accordingly, after the status of the information processing device 2 is set to "impossible to update" by updating the update status flag 281 at least once, the state can be reliably maintained.

(4) The update propriety determination unit 23 determines that the software update is permitted when the update status flag 281 has never been updated by the update control unit 22, and determines that the software update is not permitted when the update status flag 281 has been updated at least once by the update control unit 22 (Step 502). Accordingly, when there is a sign of the occurrence of a cyber attack, the software can be reliably prevented from being illegally updated.

(5) The information processing device 2 further includes the state verification unit 26 that verifies the presence or absence of an influence of an illegal attack. The update control unit 22 returns the updated update status flag 281 to the state before the update on the basis of the verification result by the state verification unit 26 (Steps 602 to 604). Accordingly, even after the software update is once prohibited by detecting the sign of the occurrence of the cyber attack, if it can be confirmed that the software is not affected by the cyber attack, the software update can be permitted again to restore the availability.

(6) The update propriety determination unit 23 determines whether or not the software can be updated, on the basis of the update status flag 281 (Step 502), when the communication unit 21 receives, as the communication message, the predetermined authentication request message requesting for the software update from the other information processing device 3 (Step 501). Accordingly, it is possible to determine whether or not the software can be updated at an appropriate timing.

(7) The information processing device 2 further includes the update authentication unit 24 that executes the authentication process of the other information processing device 3 when the communication unit 21 receives the authentication request message as the communication message, and the update execution unit 25 that executes the software update. The update execution unit 25 executes the software update (Step 506) when the update propriety determination unit 23 determines that the software update is permitted (Step 503: Yes) and when the other information processing device 3 is authenticated as a regular device in the authentication process executed by the update authentication unit 24 (Step 505: Yes). Accordingly, it is possible to reliably prevent the software from being updated by illegal means such as impersonation.

(8) When the communication unit 21 receives the predetermined prohibition message as the communication message after the update status flag 281 is updated by the update control unit 22 (Step 303: Yes), the information processing device 2 switches the control mode to the predetermined degenerate mode (Step 304). Accordingly, even when being attacked by the illegal cyber attack, the automobile can be maintained in a safe state.

Second Embodiment

Figure 10:
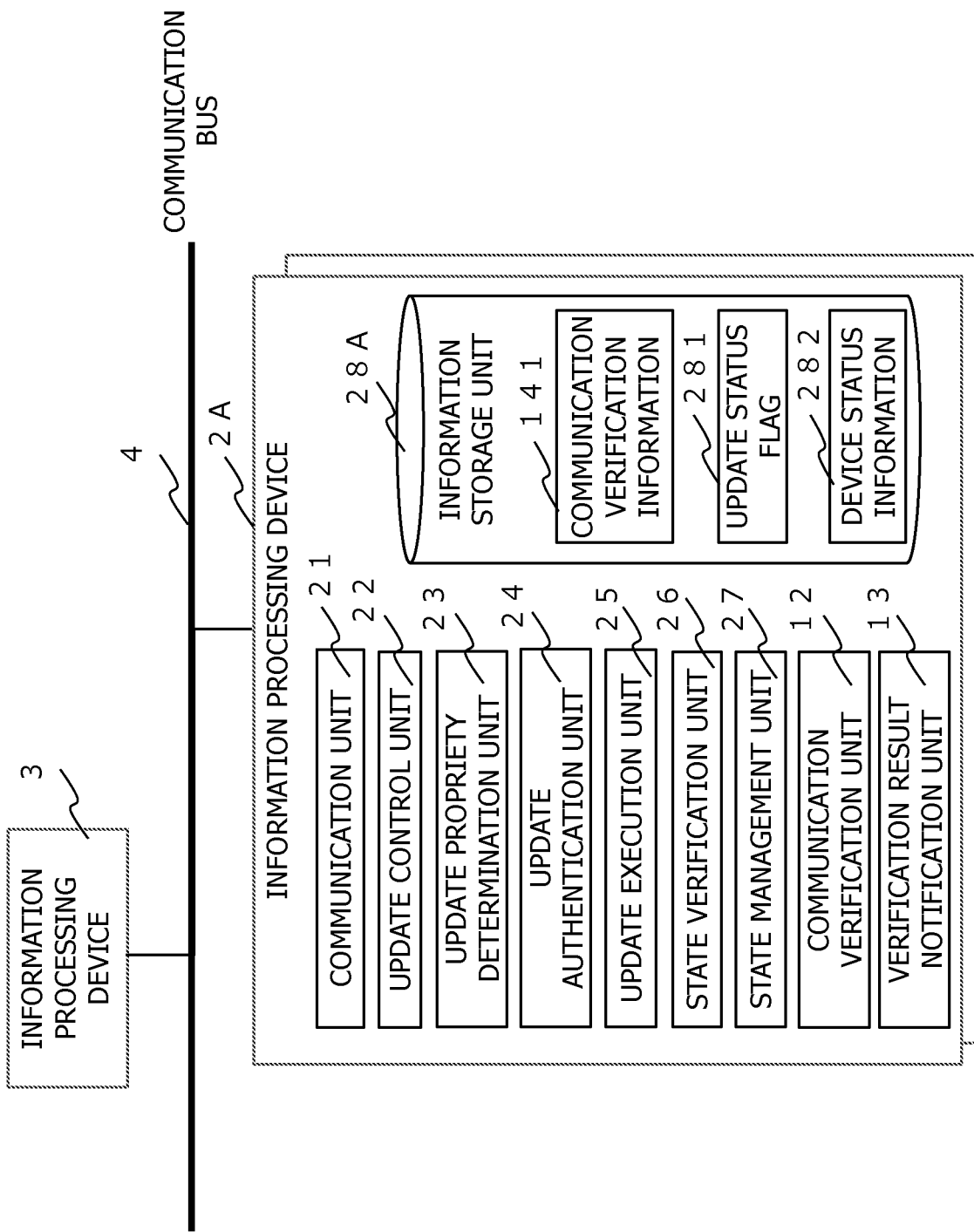
FIG. 10 is a diagram for showing a configuration of a security system for software update control according to a second embodiment of the present invention.

FIG. 10 is a diagram for showing a configuration of a security system for software update control according to a second embodiment of the present invention. The security system for software update control of FIG. 10 is configured in such a manner that one or more information processing device 2A and information processing device 3 are connected to each other via a communication bus 4. Note that as similar to the first embodiment, the information processing devices 2A and 3 are, for example, ECUs (Electronic Control Units) mounted on a vehicle, and are also connected to other devices via the communication bus 4 in the vehicle. However, the communication bus 4 is physically configured using plural communication buses, and the standards of these communication buses may be the same or different from each other.

The information processing device 2A is different from the information processing device 2 described in the first embodiment in that the information processing device 2A further has the same function as the information processing device 1. Specifically, the information processing device 2A is different from the information processing device 2 in that the information processing device 2A further has the communication verification unit 12 and the verification result notification unit 13 and has an information storage unit 28A instead of the update control information storage unit 28, and the communication verification information 141 is further stored in the information storage unit 28A in addition to the update status flag 281 and the device status information 282. Note that the communication verification unit 12, the verification result notification unit 13, and the communication verification information 141 are the same as those described in the first embodiment.

Figure 11:
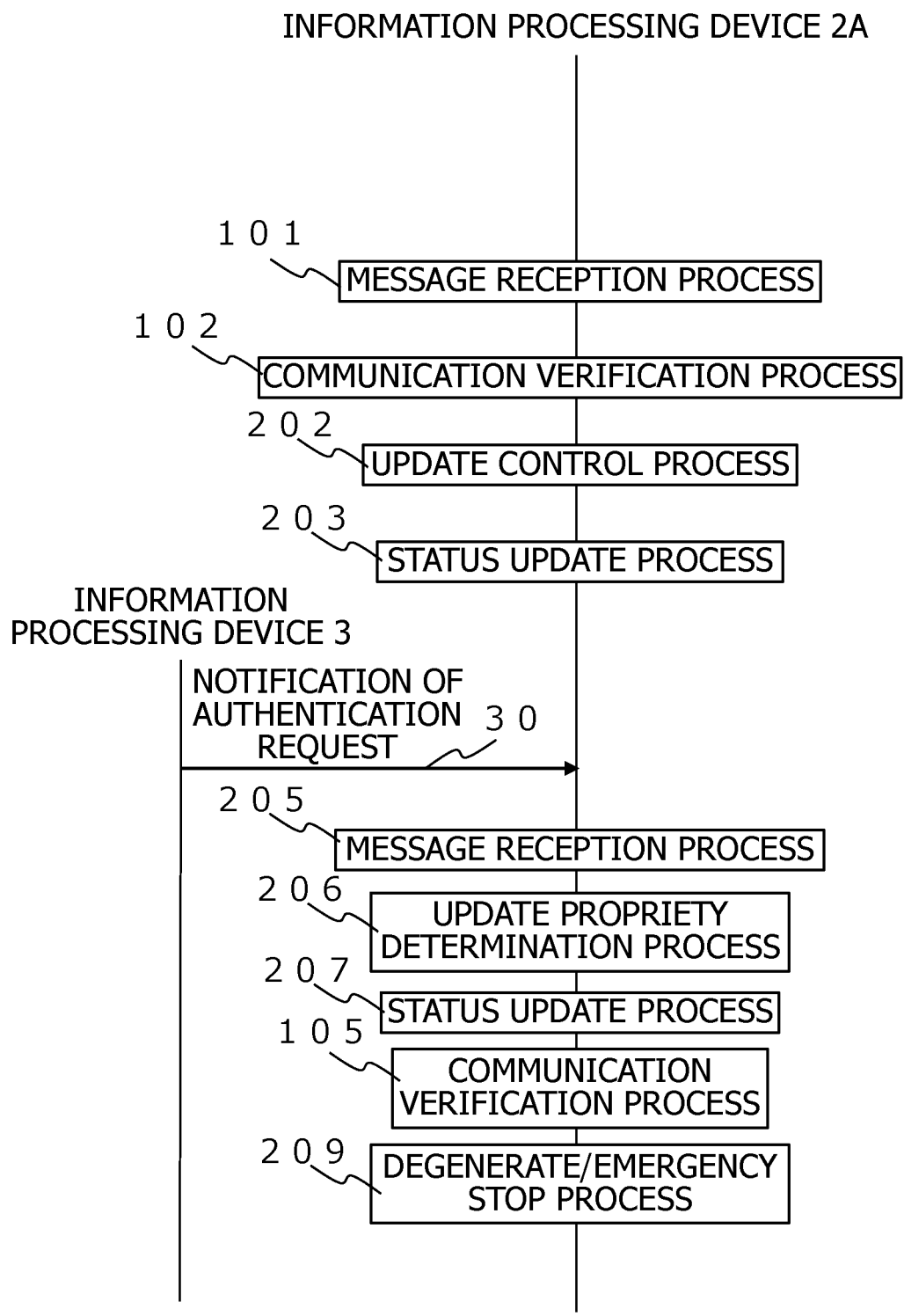
FIG. 11 is a diagram for showing an example of an entire processing sequence in the security system for software update control according to the second embodiment of the present invention.

FIG. 11 is a diagram for showing an example of a processing sequence in the security system for software update control according to the second embodiment of the present invention. Note that in FIG. 11, the step numbers common to FIG. 2 are assigned to the processes having the same contents as those in FIG. 2 described in the first embodiment. In addition, the execution subject of each step is a CPU, which is not shown, provided in the information processing device 2A.

In Step 101, the information processing device 2A allows the communication unit 21 to receive a communication message transmitted from another information processing device via the communication bus 4.

In Step 102, the information processing device 2A allows the communication verification unit 12 to verify the communication message received in Step 101. Here, it is verified whether or not the received communication message indicates the occurrence of a prohibited operation or the occurrence of a sign of a cyber attack. In the example of FIG. 11, the sign of the cyber attack is detected in Step 102 from the communication message received in Step 101, and it is decided to prohibit the software update as an ex-post measure thereagainst.

When it is decided to prohibit the software update in Step 102, the information processing device 2A allows the state management unit 27 to confirm the update status flag 281 stored in the update control information storage unit 28, and determines whether or not the software can be updated, in Step 202. In the example of FIG. 11, it is assumed that the update status flag 281 has not been updated and indicates "update permission" that is a status of permitting the software update.

In Step 203, the information processing device 2A allows the update control unit 22 to update the status of the information processing device 2A on the basis of the verification result in Step 102 and the confirmation result of the update status flag 281 in Step 202. In the example of FIG. 11, since the update prohibition of the software is decided as the verification result and the update status flag 281 has not been updated, the update status flag 281 is accordingly changed. As a result, the status of the information processing device 2A is updated from "update permission" that is a status of permitting the software update to "impossible to update" that is a status of not permitting the update.

Note that although the example of FIG. 11 is as described above, when the update prohibition of the software is not decided as the verification result in Step 102 or when it is confirmed in Step 202 that the update status flag 281 has been updated, the update status flag 281 is left as it is without updating in Step 203.

In Steps 205 to 207, the same processes as those in FIG. 2 are performed.

In Step 105, the information processing device 2A allows the communication verification unit 12 to verify the communication message received in Step 205. Here, as similar to Step 102, it is verified whether or not the received communication message indicates the occurrence of the prohibited operation or the occurrence of the sign of the cyber attack. In the example of FIG. 11, the occurrence of the prohibited operation is detected in Step 206 by the communication message of the authentication request received in Step 205. Therefore, in Step 105, it is decided to perform a degenerate operation or an emergency stop as an ex-post measure against the occurrence of the prohibited operation.

In Step 209, the information processing device 2A shifts to predetermined control for performing the degenerate operation or the emergency stop of the vehicle, according to the ex-post measure decided in Step 105.

In the security system for software update control of the embodiment, the software update in the information processing device 2A is prohibited when the sign of the illegal cyber attack against the security is detected by each of the above steps as similar to the first embodiment. Further, when an operation related to the software update is detected in the prohibition period, the emergency measure such as the degenerate operation or the emergency stop is executed, and the automobile can be maintained in a safe state.

According to the second embodiment of the present invention described above, in addition to (1) and (4) to (8) described in the first embodiment, the following effects can be further exhibited.

(9) The information processing device 2A further includes the communication verification unit 12 that detects a sign of an illegal attack based on the communication message received by the communication unit 21. The update control unit 22 updates the update status flag 281 when the communication verification unit 12 detects the sign of the illegal attack (Step 203). Accordingly, in order to prevent the software from being illegally updated when the sign of the cyber attack occurs, the update status flag 281 can be reliably updated.

(10) The update control unit 22 does not update the update status flag 281 in Step 203 when the update status flag 281 has been updated even when the communication verification unit 12 detects the sign of the illegal attack. Accordingly, after the status of the information processing device 2A is set to "impossible to update" by updating the update status flag 281 once, the state can be reliably maintained as similar to the first embodiment.

Note that the respective embodiments and various modified examples described above are merely examples, and the present invention is not limited to these contents as long as the characteristics of the invention are not impaired. In addition, although various embodiments and modified examples have been described above, the present invention is not limited to these contents. The other aspects considered within the scope of the technical idea of the present invention are also included in the scope of the present invention.

The content of the disclosure of the following application that forms the basis for priority is incorporated herein by reference.
Japanese patent application 2018-247787 (filed on Dec. 28, 2018)

LIST OF REFERENCE SIGNS 1, 2, 2A, 3: Information processing device
4: Communication bus
11: Communication unit
12: Communication verification unit
13: Verification result notification unit
14: Communication determination information storage unit
21: Communication unit
22: Update control unit
23: Update propriety determination unit
24: Update authentication unit
25: Update execution unit
26: State verification unit
27: State management unit
28: Update control information storage unit
28A: Information storage unit
141: Communication verification information
281: Update status flag
282: Device status information

The invention claimed is:

1. An information processing device of a vehicle that can update software, the information processing device comprising a processor to:
store a control information for controlling whether or not the software can be updated;
receive a communication message transmitted from a second information processing device of the vehicle connected via a communication line of the vehicle;
set the control information to either an update permission status or an impossible-to-update status on a basis of the communication message received by the processor; and
determine whether or not the software can be updated, on a basis of the control information;
responsive to determining that the software cannot be updated based on setting the control information to the impossible-to-update status, notify the second information processing device of the vehicle of the impossible-to-update status;
receive a notification of an authentication request, from a third information processing device of the vehicle, to update the software;
determine, based on the impossible-to-update status, that updating the software is a prohibited operation;
receive, from the second information processing device, a predetermined prohibition message based on the determination that the updating the software is a prohibited operation; and
in response to the processor receiving the predetermined prohibition message as a second communication message after the control information is set by the processor, switch a vehicle control mode to a predetermined degenerate mode to safely control the vehicle.

2. The information processing device according to claim 1, wherein
the processor sets the control information to the update permission status when the processor receives, as the communication message, a predetermined update control request message requesting for an update of the control information from the second information processing device.

3. The information processing device according to claim 2, wherein
the processor does not update the control information when the control information has previously been updated to the impossible-to-update status even when the processor receives an update control request message as a subsequent communication message.

4. The information processing device according to claim 1, wherein:
the processor sets the control information to the impossible-to-update status when the processor detects a sign of an illegal attack on a basis of the communication message received by the processor.

5. The information processing device according to claim 4, wherein
the processor does not subsequently update the control information when after the processor has set the control information to the impossible-to-update status after detecting the sign of the illegal attack.

6. The information processing device according to claim 1, wherein the processor further:
determines that a software update is permitted when the control information has never been updated by the processor; and
determines that the software update is not permitted when the control information has been updated at least once by the processor.

7. The information processing device according to claim 6, wherein the processor further:
verifies a presence or absence of an influence of an illegal attack, wherein
the processor returns the set control information to a state before the update on a basis of a verification result by the processor.

8. The information processing device according to claim 1, wherein
the processor determines whether or not the software can be updated, on the basis of the control information when the processor receives, as the communication message, a predetermined authentication request message requesting for a software update from the second information processing device.

9. The information processing device according to claim 8, wherein the processor:
executes an authentication process of the second information processing device when the processor receives the predetermined authentication request message as the communication message; and
executes the software update, wherein
the processor executes the software update when the processor determines that the software update is permitted and when the second information processing device is authenticated as a regular device in the authentication process executed by the processor.

* * * * *